United States Patent [19]

Rasshofer et al.

[11] Patent Number: 4,525,590
[45] Date of Patent: Jun. 25, 1985

[54] SIMPLIFIED PROCESS FOR THE PRODUCTION OF POLYAMINES BY THE ALKALINE HYDROLYSIS OF COMPOUNDS CONTAINING NCO-GROUPS

[75] Inventors: Werner Rasshofer, Cologne; Klaus König, Leverkusen; Holger Meyborg, Odenthal; Walter Meckel, Neuss; Armin Zenner, Dormagen, all of Fed. Rep. of Germany

[73] Assignee: Bayer Aktiengesellschaft, Leverkusen, Fed. Rep. of Germany

[21] Appl. No.: 398,493

[22] Filed: Jul. 15, 1982

[30] Foreign Application Priority Data

Jul. 29, 1981 [DE] Fed. Rep. of Germany ....... 3129979

[51] Int. Cl.³ ................. C07D 251/34; C07C 125/06; C07C 127/24; C07C 127/15
[52] U.S. Cl. ...................................... 544/222; 560/26; 560/158; 560/19; 564/38; 564/32; 564/47; 564/385; 564/415; 564/489; 564/488; 564/468; 564/393; 564/414
[58] Field of Search .................... 544/222; 564/38, 32, 564/47, 385, 415, 489, 488, 468, 393, 414; 560/26, 158, 19

[56] References Cited

U.S. PATENT DOCUMENTS

| 2,888,439 | 5/1959 | Simons | 260/77.5 |
|---|---|---|---|
| 3,044,989 | 7/1962 | Shivers | 260/77.5 |
| 3,184,502 | 5/1965 | Mueller et al. | 260/482 |
| 3,385,829 | 5/1968 | Heydkamp et al. | 260/75 |
| 3,625,871 | 12/1971 | Traubel et al. | 260/2.5 AY |
| 3,865,791 | 2/1975 | Brinkmann et al. | 260/77.5 |
| 4,163,831 | 8/1979 | Gessell | 526/153 |
| 4,224,417 | 9/1980 | Hajek et al. | 521/166 |
| 4,386,218 | 5/1983 | Rasshofer et al. | 564/38 |

FOREIGN PATENT DOCUMENTS

| 2948419 | 8/1981 | Fed. Rep. of Germany . |
| 848671 | 9/1960 | United Kingdom ............. 564/393 |
| 1033912 | 6/1966 | United Kingdom . |
| 1117494 | 6/1968 | United Kingdom . |

OTHER PUBLICATIONS

"The Condensed Chemical Dictionary, 8th Ed., p. 78, Van Nostrand pub., New York.

Primary Examiner—John M. Ford
Attorney, Agent, or Firm—Gene Harsh; Joseph C. Gil; Thomas W. Roy

[57] ABSTRACT

The invention relates to an improved process for the production of polyamines containing urethane and/or urea and/or biuret and/or isocyanurate groups and, preferably, also alkylene ether, carbonate and/or acetal groups by the alkaline hydrolysis of corresponding compounds containing terminal aliphatic and/or aromatic isocyanate groups.

To this end, the compounds containing terminal NCO-groups, preferably NCO-preadducts, are converted by means of selected bases into the carbamates and neutralized by introduction into equivalent quantities of acid or by the simultaneous introduction of the components in equivalent quantities into a reaction vessel, after which the polyamines are directly isolated by methods known per se.

The invention also relates to the use of the polyamines obtained by the process for the production of polyurethanes.

14 Claims, No Drawings

SIMPLIFIED PROCESS FOR THE PRODUCTION OF POLYAMINES BY THE ALKALINE HYDROLYSIS OF COMPOUNDS CONTAINING NCO-GROUPS

This invention relates to an improved process for the production of aliphatic and/or aromatic polyamines containing urethane and/or urea and/or biuret and/or isocyanurate groups and, preferably, also alkylene ether, carbonate and/or acetal groups by the alkaline hydrolysis of NCO-preadducts containing aromatic and/or aliphatic isocyanate groups, followed by simplified working-up of the polyamines obtained. The invention also relates to the use of the polyamines obtained by this process for the production of polyurethanes.

BACKGROUND OF THE INVENTION

It is known that aromatic isocyanates may be converted into primary amines by acid hydrolysis. However, the reaction is by no means complete because the amine formed during hydrolysis reacts further with unreacted isocyanate to form the corresponding urea. This secondary reaction cannot be suppressed even by using excess strong mineral acid. A fairly recent example may be found in Japanese Pat. No. 55007-827.

German Auslegeschrift No. 1,270,046 describes a process for the production of certain primary aromatic amines containing polyalkylene glycol ether segments in which reaction products of aromatic diisocyanates or triisocyanates with polyalkylene glycol ethers and/or polyalkylene glycol thioethers, preferably those having molecular weights in the range of from 400 to 4000, are reacted with secondary or tertiary carbinols, followed by thermal decomposition in an inert solvent (optionally in the presence of acid catalysts). The disadvantage of this process is that thermal decomposition of the urethanes is accompanied by the formation of flammable, readily volatile alkenes which are explosive in admixture with air so that appropriate precautionary measures have to be taken.

German Auslegeschrift No. 1,694,152 relates to the production of prepolymers containing at least two terminal amino groups by reacting hydrazine, aminophenyl ethyl amine or other diamines with an NCO-prepolymer of a polyether polyol and polyisocyanate (in an NCO:NH ratio of 1:1.5 to 1:5). In this process, unreacted amine has to be carefully removed in another step because it catalyzes the reaction with polyisocyanates to a considerable extent, thus leading to short processing times, and it actually becomes a reactant itself.

Another possible method for synthesizing polyamines containing urethane groups is described in French Pat. No. 1,415,317. NCO-prepolymers containing urethane groups are converted by treatment with formic acid into the N-formyl derivatives which are hydrolyzed to form terminal aromatic amines. The reaction of NCO-prepolymers with sulfamic acid in accordance with German Auslegeschrift No. 1,155,907 also leads to compounds containing terminal amino groups. In addition, relatively high molecular weight preadducts containing aliphatic, secondary and primary amino groups are obtained in accordance with German Auslegeschrift No. 1,215,373 by reacting relatively high molecular weight hydroxyl compounds with ammonia under pressure at elevated temperatures and in the presence of catalysts. These preadducts may also be obtained in accordance with U.S. Pat. No. 3,044,989, by reacting relatively high molecular weight polyhydroxyl compounds with acrylonitrile, followed by catalytic hydrogenation. According to German Offenlegungsschrift No. 2,546,536 and U.S. Pat. No. 3,865,791, relatively high molecular weight compounds containing terminal amino groups and urethane groups are also obtained by reacting NCO-prepolymers with enamines, aldimines or ketimines containing hydroxyl groups, followed by hydrolysis.

It has surprisingly been found that certain primary aromatic or aliphatic polyamines containing urethane and/or urea and/or biuret and/or isocyanurate groups and, optionally, alkylene ether and/or carbonate and/or acetal groups may be directly obtained by mixing compounds containing NCO-groups, preferably NCO-preadducts, with selected bases (preferably aqueous base solutions in an equivalent or excess quantity, based on the NCO-content) and treating the corresponding carbamate salt with a strong acid, preferably a mineral acid, in a quantity equivalent to the quantity of base used.

German Offenlegungsschrift No. 2,948,419 describes a process for the production of polyamines, containing urethane and/or urea groups by hydrolyzing compounds containing terminal isocyanate groups, in which the carbamate is prepared using alkali and subsequently converted into a salt by adding an excess quantity of mineral acid, accompanied by the elimination of $CO_2$. Excess mineral acid is then neutralized in a further step by the addition of a base and the polyamine thus released is separated off from the reaction product by known methods.

The invention provides for an improvement in this process, saving a working-up stage and reducing the salt load. By virtue of this improvement, the carbon dioxide is eliminated much more quickly and completely from the carbamate. The process according to the invention is particularly suitable for continuous working.

DESCRIPTION OF THE INVENTION

Accordingly, the present invention relates to a process for the production of primary aliphatic and/or aromatic polyamines containing urethane and/or urea and/or biuret and/or isocyanurate groups and, optionally, alkylene ether and/or carbonate and/or acetal groups, by hydrolyzing compounds containing aromatic and/or aliphatic NCO-groups, urethane and/or urea and/or biuret and/or isocyanurate groups and, optionally, alkylene ether and/or carbonate and/or acetal groups, characterized in that the compounds containing NCO-groups are converted into the carbamate stage by mixing with a base taken out of the I., II. and III. main group of the Periodic Chart of the Elements and/or quarternary ammonium hydroxides in the presence of water, preferably solutions of alkali- and earthalkali hydroxides in water and, to obtain the polyamine, (a) the carbamate is directly converted into a free amine by combination with a strong acid in a quantity equivalent to the quantity of base used above, accompanied by the elimination of $CO_2$, the excess base simultaneously being converted into the corresponding acid salt and (b) the free amine is isolated.

The bases used for converting the compound containing NCO-groups are preferably taken from the group comprising alkali metal, alkaline earth and quaternary ammonium hydroxides and tertiary amines.

The carbamate solution may be combined with the strong acid by various methods which are described as Methods (I) and (II).

In Method (I), the carbamate reaction mixture is added during acidification to the strong acid initially introduced in a substantially equivalent quantity.

In Method (II), the carbamate reaction mixture and the acid are mixed with one another during acidification in such a way that substantially equivalent quantities (val-quantities) of acid and base are reacted with one another per unit of time.

Preferred methods for isolating the free amine include distillation, filtration, recrystallization or dissolution and reprecipitation.

The polyamines containing urethane and/or urea and/or biuret and/or isocyanurate groups and, preferably, alkylene ether groups obtainable by the process according to the invention may be used for the production of optionally cellular polyurethane plastics and polyurethane foams, for example, by reacting (A) polyisocyanates with (B) polyamines and, optionally, (C) other low molecular weight and/or relatively high molecular weight compounds containing isocyanate-reactive groups, optionally (D) in the presence of known additives and auxiliaries, the polyamines (preferably the aromatic polyamines), produced by the process according to the invention, being used as component (B).

The compounds containing aromatic and/or aliphatic groups used in the process according to the invention are, for example, biuret polyisocyanates, urea polyisocyanates or cyanurate polyisocyanates. However, it is preferred to use NCO-preadducts (NCO-prepolymers) which are obtained in known manner by reacting water and/or high molecular weight and/or low molecular weight compounds containing hydroxy and/or amino and/or thiol groups (with molecular weights of from 60 to about 12,000) with an excess of polyisocyanate. In principle, it is possible to use for this purpose any aliphatic, cycloaliphatic, araliphatic, aromatic and heterocyclic polyisocyanates which are free from groups capable of being hydrolyzed under the reaction conditions (apart from the NCO-groups), of the type described, for example, by W. Siefken in Justus Liebigs Annalen der Chemie, 562, pages 75 to 136. Such polyisocyanates include, for example, those corresponding to the formula $$Q(NCO)_n$$

wherein n=2 to 4 (preferably 2), and

Q represents an aliphatic hydrocarbon radical containing from 2 to 18 and preferably from 6 to 10 carbon atoms, a cycloaliphatic hydrocarbon radical containing from 4 to 15, and preferably from 5 to 6, carbon atoms, an aromatic hydrocarbon radical containing from 6 to 15, preferably 6 to 13, carbon atoms, or an araliphatic hydrocarbon radical containing from 8 to 15, and preferably from 8 to 13, carbon atoms. Examples of such polyisocyanates include 1,4-tetramethylene diisocyanate, 1,6-hexamethylene diisocyanate, 1,12-dodecane diisocyanate, cycloaliphatic diisocyanates in the form of mixtures of their position and/or stereo isomers, for example, cyclobutane-1,3-diisocyanate, cyclohexane-1,3- and -1,4-diisocyanate, 1-isocyanato-3,3,5-trimethyl-5-isocyanatomethyl cyclohexane, 2,4- and 2,6-hexahydrotolylene diisocyanate, hexahydro-1,3- and/or -1,4-phenylene diisocyanate, perhydro-2,4'- and/or -4,4'-diphenylmethane diisocyanate. However, particularly suitable polyisocyanates are aromatic diisocyanates, for example 1,3- and 1,4-phenylene diisocyanate, 2,4- and 2,6-tolylene diisocyanate and mixtures of these isomers, diphenyl methane-2,4'- and/or -4,4'-diisocyanate, including its alkyl- and chlorine-substituted derivatives and naphthylene-1,5-diisocyanate. Examples include 3-methyl- or 3,3'-dimethyl- or 3,3'-dipropyl- or 3,3'-diisopropyl or 3-methyl-3'-isopropyl- or 3,3',5,5'-($C_1$–$C_4$)-tetraalkyl- or 3,3'-dimethyl-, 5,5'-diisopropyl diphenyl methane-4,4'-diisocyanates.

Other suitable polyisocyanates for use in the formation of the NCO-preadduct are sulfur-containing diisocyanates because they give particularly low-melting end products. Examples of diisocyanates such as these are 2,4'-diisocyanato-3'-ethyl diphenyl sulfide, 2,4'-diisocyanato-3'-ethylthio-diphenyl sulfide, 2,4'-diisocyanato-5-ethyl diphenyl sulfide, 2,4'-diisocyanato-5-isopropylthio diphenyl sulfide, 2-(2'-isocyanatoethylthio)-phenyl isocyanate, 2-(6'-isocyanato-hexylthio)-phenyl isocyanate, 2-(2'-isocyanatohexylthio)-4-phenylisocyanate.

It is also possible, for example, to use triphenyl methane-4,4',4''-triisocyanate; polyphenylpolymethylene polyisocyanates of the type obtained by condensing aniline with formaldehyde, followed by phosgenation, and described, for example, in British Pat. Nos. 874,430 and 848,671; and m- and p-isocyanatophenyl sulfonyl isocyanates according to U.S. Pat. No. 3,454,606. Perchlorinated aryl polyisocyanates of the type described, for example, in German Auslegeschrift No. 1,157,601 (U.S. Pat. No. 3,277,138); norbornane diisocyanates according to U.S. Pat. No. 3,492,330; and polyisocyanates containing isocyanurate groups of the type described, for example, in U.S. Pat. No. 3,001,973, and in German Pat. Nos. 1,022,789; 1,222,067; 1,027,394; 1,929,034; and 2,004,048 may be used. Also, polyisocyanates containing urethane groups of the type described, for example, in Belgium Pat. No. 752,261 or in U.S. Pat. Nos. 3,394,164 and 3,644,457; polyisocyanates containing acylated urea groups according to German Pat. No. 1,230,778; and polyisocyanates produced by telomerization reactions of the type described, for example, in U.S. Pat. No. 3,654,196 are suitable. Polyisocyanates containing allophanate groups may also be used, although this is less preferred because they are also decomposed to a considerable extent under the NCO/carbamate hydrolysis conditions.

In general, it is preferred to use the commercially-readily-obtainable polyisocyanates, for example 2,4- and 2,6-tolylene diisocyanate and mixtures of these isomers ("TDI"), polyphenyl polymethylene polyisocyanates of the type obtained by condensing aniline with formaldehyde, followed by phosgenation ("crude MDI") and polyisocyanates containing urethane groups, isocyanurate groups or urea groups ("modified polyisocyanates"), particularly modified polyisocyanates of the type derived from 2,4- and/or 2,6-tolylene diisocyanate and from 4,4'- and/or 2,4'-diphenyl methane diisocyanate. The tolylene diisocyanates (TDI) are particularly preferred.

The compounds preferably used for producing the NCO-preadduct have a molecular weight in the range from 400 to 12,000, and more particularly in the range of from 400 to 6000, contain at least two, preferably 2 to 4 and, more particularly, 2 or 3 hydroxyl, amino and/or thiol groups (preferably hydroxyl groups), and are free from readily-hydrolyzable groups, such as ester groups, for example. Compounds of this type are, for example, the polyacetals, polythioethers and, in particular, polyethers commonly used in polyurethane chemistry, particularly polyethers containing alkylene ether groups. Suitable alkylene ether groups are, in particular, the —CH$_2$.CH$_2$.O—, the

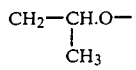

and —(CH$_2$)$_4$.O-groups, if desired even in admixture with one another.

The polyethers containing at least 2, generally from 2 to 8, and preferably 2 or 3, hydroxyl groups suitable for use in accordance with the invention are known and are obtained, for example, by polymerizing epoxides, such as ethylene oxide, propylene oxide, butylene oxide, tetrahydrofuran, styrene oxide or epichlorohydrin on their own, for example, in the presence of Lewis catalysts, such as BF$_3$. They may also be obtained by the addition of these epoxides, preferably ethylene oxide and propylene oxide, optionally in admixture or successively, with starter components containing reactive hydrogen atoms, such as water, alcohols, ammonia or amines, for example, ethylene glycol, 1,3-propylene glycol or 1,2-propylene glycol, trimethylol propane, glycerol, sorbitol, 4,4'-dihydroxydiphenyl propane, aniline, ethanolamine or ethylene diamine. Sucrose polyethers of the type described, for example, in German Auslegeschrift Nos. 1,176,358 and 1,064,938 and also formitol- or formose-started polyethers (German Offenlegungsschrift Nos. 2,639,083 and 2,737,951) may also be used in accordance with the invention. In many cases, it is preferred to use polyethers of the type which contain predominantly primary OH-groups (up to 90% by weight, based on all the OH-groups present in the polyether). Polybutadienes containing OH-groups may also be used for the purposes of the invention.

Among the polythioethers, reference is made, in particular, to the condensation products of thiodiglycol on its own and/or with other glycols.

Polyhydroxyl compounds already containing urethane or urea groups and optionally-modified natural polyols may also be used. It is also possible, in accordance with the invention, to use addition products of alkylene oxides with phenol-formaldehyde resins, or even with urea-formaldehyde resins.

Before they are used, the polyhydroxyl compounds mentioned above may be modified in various ways. Thus, according to German Offenlegungsschrift No. 2,210,839 (U.S. Pat. No. 3,849,515) and Offenlegungsschrift No. 2,544,195, a mixture of various polyhydroxyl compounds may be condensed by etherification in the presence of a strong acid to form a relatively high molecular weight polyol which is made up of various segments joined by ether bridges. It is also possible, for example, to introduce amide groups into the polyhydroxyl compounds, for example, in accordance with Offenlegungsschrift No. 2,559,372.

Representatives of the above-mentioned compounds suitable for use in accordance with the invention are described, for example, in High Polymers, Vol. XVI, "Polyurethanes, Chemistry and Technology" by Saunders-Frisch, Interscience Publishers, New York, London, Vol. I, 1962, pages 32 to 42 and pages 44 to 54, and Vol. II, 1964, pages 5 and 6 and 198 and 199 and in Kunststoff-Handbuch, Vol. VII, Vieweg-Hochtlen, Carl-Hanser-Verlag, Munich, 1966, for example on pages 45 to 71. It is, of course, possible to use mixtures of the above-mentioned compounds containing at least 2 isocyanate-reactive hydrogen atoms and having a molecular weight of from 400 to 12,000, for example, mixtures of various polyethers.

Other starting components which may be used for the production of the NCO-preadduct used in the process according to the invention are compounds containing at least two isocyanate-reactive hydrogen atoms and having a molecular weight in the range of from 18 to 399, and preferably in the range of from 60 to 399. In this case, too, the compounds in question are water and/or compounds containing hydroxyl groups and/or compounds containing amino groups and/or compounds containing thiol groups, preferably compounds containing hydroxyl groups, of the type widely used as chain-extending or cross-linking agents in polyurethane chemistry. The compounds in question generally contain from 2 to 8, and preferably from 2 to 4, isocyanate-reactive hydrogen atoms.

In these cases, too, it is possible to use mixtures of different compounds containing at least two isocyanate-reactive hydrogen atoms and having a molecular weight in the range of from 18 to 399.

Examples of compounds such as these are water, ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bishydroxymethyl cyclohexane, 2-methyl-1,3-propane diol, dibromobutane diol (U.S. Pat. No. 3,723,392), glycerol, trimethylol propane and 1,2,6-hexane triol. Additional suitable compounds include trimethylol ethane, pentaerythritol, quinnitol, mannitol and sorbitol, dianhydromannitol and dianhydrosorbitol, castor oil, di-, tri- and tetra-ethylene glycol, di-, tri- and tetrapropylene glycol, dibutylene glycol and higher polyethylene, polypropylene or polybutylene glycols having a molecular weight of up to 399, 4,4'-dihydroxydiphenyl propane, dihydroxymethyl hydroquinone, ethanolamine, diethanolamine, N-methyl diethanolamine, triethanolamine, 3-aminopropanol and dihydroxymethyl resorcinol.

Other suitable low molecular weight polyols are the mixtures of hydroxy aldehydes and hydroxy ketones ("formose") and the polyhydric alcohols ("formitol") obtained therefrom by reduction, of the type formed in the autocondensation of formaldehyde hydrate in the presence of metal compounds as catalysts and compounds capable of enediol formation as cocatalysts (German Offenlegungsschrift Nos. 2,639,084; 2,714,084; 2,714,104; 2,271,186; 2,738,154 and 2,738,512).

Aliphatic diamines suitable for use in accordance with the invention are, for example, ethylene diamine, 1,4-tetramethylene diamine, 1,6-hexamethylene diamine, 1,12-dodecamethylene diamine and mixtures thereof and 1-amino-3,3,5-trimethyl-5-aminomethyl cyclohexane ("isophorone diamine"). Additional suitable aliphatic diamines include 2,4- and 2,6-hexahydrotolylene diamine and mixtures thereof, perhydro-2,4'- and 4,4'-diaminodiphenylmethane, p-xylylene diamine, bis-(3-aminopropyl)-methylamine, diaminoperhydroanthracenes (German Offenlegungsschrift No. 2,638,731) and cycloaliphatic triamines according to German Offenlegungsschrift No. 2,614,244. Hydrazine and substituted hydrazines, for example methyl hydrazine, may also be used in accordance with the invention.

Examples of aromatic diamines are the diamines containing ether groups according to German Offenlegungsschrift Nos. 1,770,525 and 1,809,172 (U.S. Pat. Nos. 3,654,364 and 3,736,295), 2-halogen-1,3-phenylene diamines optionally substituted in the 5-position (German Offenlegungsschrift Nos. 2,001,772; 2,025,896 and 2,065,869), 3,3'-dichloro-4,4'-diaminodiphenyl methane and tolylene diamines. Additionally, 4,4'-diaminodiphenylmethane, 4,4'-diaminodiphenyl disulfides (German Offenlegungsschrift No. 2,404,976), diaminodiphenyl dithioethers (German Offenlegungsschrift No. 2,509,404), aromatic diamines substituted by alkylthio groups (German Offenlegungsschrift No. 2,638,760), aromatic diamines containing sulfonate or carboxylate groups (German Offenlegungsschrift No. 2,720,166) and the high-melting diamines mentioned in German Offenlegungsschrift No. 2,635,400 may also be used. Examples of aliphatic-aromatic diamines are the aminoalkyl thioanilines according to German Offenlegungsschrift No. 2,734,574.

The NCO-preadducts containing free isocyanate groups are obtained in a known manner by combining the reactants either in a melt or in solution and are generally oily to wax-like in consistency, depending on the starting components used. The equivalent ratio of NCO-groups to active hydrogen atoms (preferably OH-groups) is greater than 1 and should generally be between 1.5:1 and 2.8:1, but it is possible to use an even larger excess of polyisocyanate (for example, 4:1). If the NCO/OH ratio amounts to more than 2, non-extended preadducts are mostly obtained whereas NCO/OH ratios of less than 2 result in an increase in the average molecular weight of the preadducts.

As already explained, it is also possible to use low molecular weight polyols as chain-extending agents in the production of the prepolymers in addition to relatively high molecular weight starting compounds. In this case, relatively high molecular weight preadducts are obtained.

The NCO-preadducts preferably used for the process according to the invention are NCO-preadducts which have been obtained from relatively high molecular weight polyether glycols, polycarbonates and/or polyacetals (as relatively hydrolysis-stable, relatively high molecular weight polyhydroxyl compounds), optionally using chain-extending agents of the type described above, an aliphatic and/or aromatic diisocyanate in an equivalent ratio of from 1:1.5 to 1:2.8 and, more particularly, of the order of 1:1.9 to 1:2, and of which the total functionality in the mixture of all the components does not exceed 4.

In the process according to the invention, the compound containing NCO-groups (preferably an NCO-preadduct) is mixed while stirring for 5 minutes to 6 hours, and preferably for 30 minutes to 2 hours, with a solution of a base in water or in a mixture of water and an NCO-inert solvent which is tempered at about 0° to 70° C., preferably at 0° to 40° C. and, more preferably, at 10° to 25° C. The concentration of the base preferably amounts to 1 part by weight of base to between 5 and 20 parts by weight of water or water/NCO-inert solvent mixture. Where the NCO-compound and base are continuously mixed, appropriate quantities are mixed very quickly in high-performance mixing units.

The compound containing NCO-groups is preferably used in pure form. However, the compound containing NCO-groups may also be dissolved in a suitable NCO-inert solvent, which should advantageously be miscible with water (for example, dioxane, tetrahydrofuran, dimethoxyethane), and introduced in the form of a solution into the base.

The compound containing NCO-groups is preferably used in pure form in cases where it is liquid or it may be liquefied at temperatures in the range of from 10° to about 90° C. In cases where it is solid at temperatures in the range from 10° to about 90° C., it is preferably used in dissolved form.

If the NCO-preadduct is used in the form of a solution in an NCO-inert solvent, it is possible, for example, to use from 1 to 400 parts of NCO-preadduct to 100 parts of solvent.

The compounds containing NCO-groups and also their solutions are preferably tempered at 45° to 70° C. in order to increase their reaction velocity and to increase their fine dispersion in the base solution. Where NCO-preadduct solutions are used, they are heated to temperatures of from 45° to 70° C. but at most to a temperature which corresponds to the boiling temperature of the solvent. Compounds containing NCO-groups which are neither fusible nor soluble at temperatures in the above-mentioned range may also be used in solid, very finely divided form.

As "bases" for the process of the invention are to be used the oxides or hydroxides of the I., II. and III. main group of the Periodic Chart of the Elements and/or quarternary ammonium hydroxides in the application invention shortly mentioned as bases).

Examples are alkali- and earthalkali hydroxides, alkalialuminates, earthalkali oxides such as calcium oxide or tetraalkylammonium hydroxides. Preferred are hydroxyl ions containing bases such as alkali hydroxides, calcium hydroxides or tetraalkylammonium hydroxides such as tetramethylammonium hydroxide, wherein these bases have a sufficient solubility in water to form solutions. As hydroxyl ions containing solutions the alkali hydroxides are preferred, especially the sodium and potassium hydroxide.

The quantity of base corresponds to between 0.3 and 2.0 equivalents per NCO-group. The base is preferably used in such a quantity that some free base is left over on completion of the reaction. In cases where the bases, for example alkali hydroxides, are used, an NCO/OH$^\ominus$ ratio of from 1:1.01 to 1:2, preferably from 1:1.2 to 1:8 and, more preferably, from 1:1.4 to 1:1.6 is used.

However, it is also possible to use OH$^\ominus$-ions in a substoichiometric quantity relative to the quantity of NCO-groups. In that case, products pre-extended by urea groups are obtained, which is an advantage for certain applications. An OH$^\ominus$/NCO-ratio of $\geq 0.3:1$ may thus be used.

Where compounds containing tertiary amino groups are used, a ratio of NCO-groups to tertiary amino groups of from 1:1.01 to 1:1.5, and particularly of 1:1.1 to 1:1.3, is preferred.

In order to improve the homogeneity of the reaction mixture, it is preferred to add a standard commercial emulsifier in quantities of from 0.05 to 1 part by weight, and preferably in quantities of from about 0.1 to 0.5 part by weight (based on 100 parts of reaction mixture).

After the NCO-preadduct has been added, stirring is preferably continued for about 15 to 180 minutes at 10° to 25° C. The carbamate reaction mixture is then treated with acid. This acid treatment may be carried out by two different methods, as suggested above.

Method I

The carbamate reaction mixture is added dropwise to the acid component.

The acids used are strong acids, for example, aqueous mineral acids, such as hydrochloric acid, sulfuric acid, dilute nitric acid or phosphoric acid. It is also possible to use strong organic acids, such as oxalic acid, formic acid or acetic acid, or similarly strong organic acids having a strength at least equivalent to that of acetic acid. It is preferred to use hydrochloric acid and sulfuric acid and particularly preferred to use sulfuric acid. The acid initially introduced best has a temperature of from 0° to 20° C. The carbamate reaction mixture is added with stirring over a period of from 1 minute to 6 hours and preferably over a period of from 30 minutes to 2 hours, the temperature of the reaction mixture having to be kept below 25° C. by external cooling. The time taken to add the carbamate reaction mixture will depend upon the intensity of the evolution of gas which begins immediately.

The acid:base equivalent ratio amounts to approximately 1:1, in other words, 1 equivalent of protons is used per equivalent of $OH^-$-ion (substantially equivalent quantities). The reaction mixture is then neutral to basic, commensurate with the pH-value of a mixture of alkali salts or amine salts with an aromatic or aliphatic amino compound. The reaction mixture is then stirred for another 5 to 30 minutes at 20° C.

In the case of a liquid amino compound, workingup is carried out, for example, by freeing the reaction mixture as a whole from volatile fractions by distillation (for example, at 15 to 700 Torr and at a bath temperature of from 40° to 150° C.), separating off the salt fractions precipitated by filtration (for example, using a heatable pressure filter) and freeing the amine-containing product left over from traces of volatile components, for example, over a period of 2 hours at 0.013 to 20 mbar and at 80° to 150° C.

If the amino compound accumulates in solid form, it is filtered off and, if necessary, purified by standard methods, such as recrystallization or dissolution and reprecipitation.

Method II

Method II is preferred over Method I.

In Method II, the carbamate component and the acid component are separately introduced into a common reaction zone. The procedure preferably adopted is such that equivalent quantities of $OH^-$-ions or of tertiary amino groups and protons reach the reaction zone at the same time, thereby avoiding imbalances between the reaction components. The additions may be made, for example, using graduated dropping funnels or a piston-type metering pump or any other type of dosing machine.

In the remaining part of the method, the temperature ranges to be observed and the method used for working up are the same as in Method I. The reaction times are generally the same as in Method I, although it is also possible and—in one continuous embodiment—preferred to mix and react both components very quickly (seconds or fractions of a second) using a suitable mixing machine.

By virtue of their low vapor pressure, the polyamines obtained in accordance with the invention are preferably used as reactants for polyisocyanates in the production of optionally cellular polyurethane plastics, for which purpose they may even be combined with other low molecular weight compounds (molecular weights of from 32 to 399) and/or relatively high molecular weight compounds (molecular weights of from 400 to approximately 12,000) containing isocyanate-reactive groups. Suitable starting components for the production of polyurethane plastics are mentioned in the foregoing in connection with production of the prepolymer and also described in German Offenlegungsschrift Nos. 2,302,564; 2,432,764 (U.S. Pat. No. 3,963,679); 2,639,083; 2,512,385; 2,513,815; 2,550,796; 2,550,797; 2,550,833; 2,550,860; and 2,550,862, where information may also be found on the auxiliaries and additives optionally used in the production of polyurethanes.

The present invention also relates to the production of polyurethane ureas using the polyamines produced in accordance with the invention.

Further applications for the polyamines produced in accordance with the invention include, for example, as coupling components for diazo dyes, as hardeners for epoxide and phenolic resins and in any other known reactions for amines, such as, for example, amide-forming or imide-forming reactions.

The process according to the invention is illustrated by the following Examples in which the quantities quoted represent parts by weight and percentages by weight, unless otherwise indicated.

EXAMPLES

Example 1

Production of the Carbamate

A solution of 88 g (1.57 moles) of potassium hydroxide and 1.1 g of Mersolat ®H (emulsifier on the basis of alkylsulfonic acids (K-salt)) in 1.1 liters of water is initially introduced into the reaction vessel and externally cooled by means of an ice bath. 1.1 kg of an NCO-preadduct produced from 2,4-tolylene diisocyanate and a linear polypropylene glycol ether (average molar weight=2000) and having an NCO-value of 4% are added dropwise over a period of 60 minutes, an internal temperature of from 18° to 23° C. being maintained. After stirring for 45 minutes at 20° C., 1 liter of methanol is added to reduce the viscosity of the mixture.

Production of the Amine (Using Method I)

The above carbamate reaction mixture is added over a period of 60 minutes to a solution of 155 g of concentrated hydrochloric acid (1.57 moles) in 150 ml of water, an internal temperature of from 20° to 23° C. being maintained with intensive stirring. 22 liters of carbon dioxide (93.6% of theoretical) are given off. The two-phase solution is freed from the solvents by distillation (20 mbar/100° C. and then 0.13 mbar/100° C.). The potassium chloride precipitated is separated off by filtration. The oily filtrate does not show any reaction with a solution of silver nitrate in nitric acid.

| Product data: | |
|---|---|
| NH-number (mg of KOH/g) | 41.8 (theoretical: 48.8) |
| Acid number (mg of KOH/g) | 0.9 |
| Molar weight | 2600 (theoretical: 2296) |
| Water content (%) | 0.04 |
| Viscosity $\eta 75°$ C. (mPa's) | 418 |
| Yield (g) | 1043 (93% of the theoretical) |

Example 2

Production of the Carbamate

An ice-cooled mixture of 204 g of a 50% potassium hydroxide solution (1.82 moles), 1.4 liters of water and 1.5 g of Mersolat ®H dissolved therein is initially introduced into the reaction vessel. 1.5 kg of an NCO-preadduct produced from tolylene-2,4-diisocyanate and a linear polypropylene glycol ether (average molar weight = 2000) and having an NCO-value of 3.4% are added over a period of 60 minutes (OH$^\ominus$:NCO ratio = 1.5:1), the NCO-preadduct having been heated to 60° C. An internal temperature of 18° to 22° C. is maintained during addition of the NCO-preadduct. The reaction mixture is then stirred for 20 minutes at 20° C.

Production of the Amine (Using Method II)

1 kg of the above reaction mixture is diluted with 1 liter of methanol and introduced into a suitable dropping funnel.

29.9 g of 96% sulfuric acid are diluted with 150 ml of water and also introduced into a different suitable dropping funnel.

Both dropping funnels are simultaneously emptied over a period of 15 minutes into a reaction vessel containing 100 ml of water (as stirring medium) at such a rate that equivalent quantities of base and acid are added per unit of time. The reaction vessel is cooled to such an extent that the internal temperature amounts to between 20° and 25° C. The elimination of carbon dioxide is vigorous and spontaneous with 8.8 liters of $CO_2$ (100%) being measured. Water and methanol are distilled off from the two-phase reaction mixture at 20 mbar/100° C. and then at 0.13 mbar/100° C., after which the sodium sulfate is filtered off under suction. The filtrate is free from sulfate anions (baryta test).

| Product data: | |
|---|---|
| Yield (g) | 430 (91% of the theoretical) |
| NH-number (mg of KOH/g) | 44.3 (theoretical: 48.8) |
| Acid number (mg of KOH/g) | 0.1 |
| Molar weight | 2500 (theoretical: 2296) |
| Viscosity $\eta 75°$ C. (mPa's) | 414 |
| Water content (%) | 0.01 |

Example 3

Production of the Carbamate

A solution of 37.29 g of potassium hydroxide (0.666 mole) and 0.2 g of Mersolat ®H in 850 ml of water is initially introduced into the reaction vessel. It is externally cooled by means of an ice bath. 1 kg of an NCO-prepolymer produced from 4,4'-diisocyanatodiphenylmethane and a propylene glycol-started mixed (20/80) polyether of ethelene oxide and propylene oxide (average molar weight = 4000) and having an NCO-value of 1.86% is added dropwise with stirring over a period of 70 minutes (OH$^\ominus$:NCO ratio = 1.5:1), the NCO-prepolymer having been heated to 50° C. An internal temperature of from 15° to 20° C. is maintained during addition of the NCO-prepolymer. After the reaction mixture has been stirred for 20 minutes at 20° C., it is diluted with 600 ml of ethanol.

Production of the Amine (Using Method II)

The above reaction mixture is introduced into a suitable dropping funnel.

65.7 g of concentrated hydrochloric acid (0.666 mole of hydrogen chloride) are diluted with 350 ml of water and similarly introduced into a different suitable dropping funnel.

Both dropping funnels are simultaneously emptied over a period of 35 minutes into a reaction vessel containing 150 ml of water at such a rate that equivalent quantities of acid and base are added per unit of time. The reaction vessel is cooled so that the internal temperature is in the range of from 20° to 25° C. The evolution of carbon dioxide is vigorous and spontaneous, 9.4 liters (94.5% of theoretical) of $CO_2$ being measured. Water and ethanol are distilled off (20 mbar/100° C. and then 0.26 mbar/100° C.) and the potassium chloride is filtered off under suction from the two-phase reaction mixture. The filtrate is free from chloride ions (silver nitrate test).

| | |
|---|---|
| Yield (g) | 950 (96% of theoretical) |
| Acid number (mg of KOH/g) | 0.4 |
| Viscosity $\eta 75°$ C. (mPa's) | 1350 |
| NH-number (mg of KOH/g) | 24.0 (theoretical: 25.2) |
| Molar weight | 4700 (theoretical: 4448) |
| Water content (%) | 0.2 |

Example 4

Production of the Carbamate

A solution of 38.63 g of potassium hydroxide (0.69 mole) and 0.5 g of Mersolat ®H in 600 ml of water is initially introduced into the reaction vessel and cooled by means of an ice bath. 1 kg of a "thin-layered" NCO-preadduct produced from 2,4-tolylene diisocyanate and a trimethylol-propane-started polypropylene/polyethylene block copolyether triol (average molar weight = 6000) and having an NCO-value of 1.93% is added dropwise with stirring over a period of 40 minutes (OH$^\ominus$:NCO ratio = 1.5:1), the NCO-preadduct having been heated to 65° C. An internal temperature of 18° to 22° C. is maintained during the addition. After it has been stirred for 60 minutes at 20° C., the reaction mixture is diluted while stirring with 500 ml of i-propanol.

Production of the Amine (Using Method II)

The above reaction mixture is introduced into a suitable dropping funnel.

35.22 g of 96% sulfuric acid (0.345 mole of $H_2SO_4$) are diluted with 300 ml of water and introduced into a different suitable dropping funnel.

Both dropping funnels are simultaneously emptied over a period of 90 minutes into a reaction vessel containing 100 ml of water at such a rate that equivalent quantities of acid and base are added per unit of time. The reaction vessel is cooled so that the internal temperature does not exceed 30° C. The evolution of carbon dioxide begins spontaneously and a total of 25.8 liters (99% of theoretical) of $CO_2$ is measured. Water and i-propanol are distilled off (20 mbar/100° C. and then 0.067 mbar/100° C.) and the potassium sulfate filtered off under suction from the two-phase reaction mixture, the filtrate being freed from traces of volatile constituents at 0.27 mbar/100° C.

| | |
|---|---|
| Yield (g) | 980 (100% of theoretical) |
| Acid number (mg of KOH/g) | 0.42 |
| Viscosity $\eta 75°$ C. (mPa's) | 952 |
| NH-number (mg of KOH/g) | 23.5 (theoretical: 26.1) |
| Molar weight | 7100 (theoretical: 6444) |
| Water content (%) | 0.31 |

Example 5

Production of the Carbamate

A solution of 47.71 g of sodium hydroxide (1.19 moles) and 0.6 g of Mersolat ®H in 500 ml of water is initially introduced into the reaction vessel. 1 kg of a "thin-layered" NCO-prepolymer produced from 2,4-tolylene diisocyanate and a propylene-glycol-started polypropylene glycol ether (average molar weight=2000) and having an NCO-value of 3.58% is added dropwise with stirring over a period of 165 minutes (OH$^\ominus$:NCO ratio=1.4:1) the NCO-prepolymer having been heated to 55° C. An internal temperature of 15° to 20° C. is maintained during the addition. After it has been stirred for 45 minutes at 20° C., the reaction mixture is diluted with 500 ml of dioxane.

Production of the Amine (Using Method I)

90.85 g of 85% phosphoric acid (0.595 mole of $H_3PO_4$) diluted with 150 ml of water are initially introduced into the reaction vessel. The above carbamate reaction mixture is added with stirring over a period of 120 minutes during which the temperature should not rise above 25° C. 18.6 liters (97.5% of theoretical) of carbon dioxide are given off. Dioxane and water are distilled off from the two-phase reaction mixture at 20 mbar/100° C. After residues of volatile constituents have been removed at 0.13 mbar/100° C., the disodium phosphate ($Na_2HPO_4$) is filtered off under suction.

| | |
|---|---|
| Yield (g) | 975 (100% of theoretical) |
| NH-number (mg of KOH/g) | 47.1 (theoretical: 48.8) |
| Acid number (mg of KOH/g) | 0.7 |
| Molar weight | 2400 (theoretical: 2296) |
| Water content (%) | 0.14 |
| Viscosity $\eta 75°$ C. (mPa's) | 389 |

Example 6

Production of the Carbamate

A solution of 71.23 g of sodium hydroxide (1.78 mole of NaOH) in 1 liter of water is initially introduced. 1 kg of a "thin-layered" NCO-prepolymer produced from a mixture of 2,4-tolylene diisocyanate (80%) and 2,6-tolylene diisocyanate (20%) and a linear polypropylene glycol ether (average molecular weight=1000) and having an NCO-value of 6.23% is added dropwise with stirring over a period of 120 minutes (NCO:OH$^\ominus$ ratio=1:1.2), the NCO-prepolymer having been heated to 70° C. An internal temperature of 15° to 20° C. is maintained during the addition. After the reaction mixture has been stirred for 30 minutes at 20° C., it is diluted with 1 liter of methanol.

Production of the Amine (Using Method II)

The above reaction mixture is introduced into a suitable dropping funnel.

90.85 g of 96% sulfuric acid (0.88 mole) are diluted with 500 ml of water and introduced into a different suitable dropping funnel.

Both dropping funnels are simultaneously emptied over a period of 90 minutes into a reaction vessel containing 100 ml of water at such a rate that equivalent quantities of acid and base are added per unit of time. The reaction vessel is cooled so that the internal temperature does not exceed 30° C. The vigorous evolution of carbon dioxide begins immediately, 83.2 liters of $CO_2$ (96.3% of theoretical) being collected. After the evolution of gas has stopped, water and methanol are distilled off (at 100° C./20 mbar) and the sodium sulfate filtered off under suction from the two-phase reaction mixture and residues of volatile constituents removed from the filtrate at 0.33 mbar/100° C.

Product data:

| | |
|---|---|
| Yield (g) | 950 (99% of theoretical) |
| NH-number (mg of KOH/g) | 71.3 (theoretical: 86.4) |
| Acid number (mg of KOH/g) | 0.4 |
| Molar weight | 1600 (theoretical: 1296) |
| Viscosity $\eta 75°$ C. (mPa's) | 790 |

Example 7

Production of the Carbamate

A solution of 180.8 g of sodium hydroxide (4.52 moles) and 0.8 g of Mersolat ®H in 1 liter of water is initially introduced into the reaction vessel. 1 kg of a solution of a "thin-layered" NCO-prepolymer of 1,6-diisocyanatohexane and tripropylene glycol, having an NCO-value of 14.6% (OH$^\ominus$:NCO ratio 1.3:1), in 1000 ml of dioxane heated to 30° C. is added with stirring over a period of 120 minutes. An internal temperature of 15° to 20° C. is maintained during the addition. The reaction mixture is stirred for 45 minutes at 25° C.

Production of the Amine (Using Method II)

The above reaction mixture is introduced into a suitable dropping funnel.

233.1 g of 96% sulfuric acid (2.26 moles of $H_2SO_4$) are diluted to 1 liter and similarly introduced into a different suitable dropping funnel.

Both dropping funnels are simultaneously emptied over a period of 150 minutes into a reaction vessel containing 100 ml of water at such a rate that equivalent quantities of acid and base are added per unit of time. The reaction vessel is cooled so that the internal temperature does not exceed 25° C. The vigorous evolution of gas releases 190 liters (98% of the theoretical) of carbon dioxide. Dioxane and water are distilled off from the two-phase reaction mixture first at 20 mbar/100° C. and then at 0.13 mbar/100° C. The salt is separated from the amine by filtration.

Product data:

| | |
|---|---|
| Yield (g) | 900 (99% of the theoretical) |
| NH-number (mg of KOH/g) | 189 (theoretical: 194) |

-continued

Product data:

| | |
|---|---|
| Molar weight | 600 (theoretical: 577) |
| Viscosity η75° C. (mPa's) | 260 |
| Water content (%) | 0.25 |
| Acid number (mg of KOH/g) | 0.28 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of an aromatic and/or aliphatic primary polyamine containing a member selected from the group consisting of urethane, urea, biuret and isocyanurate groups which comprises
   (a) converting a compound containing aromatic and-/or aliphatic NCO-groups and a member selected from the group consisting of urethane, urea, biuret and isocyanurate groups into the corresponding carbamate by mixing said compound with a base derived from a Group IA, IIA or IIIA metal of the Periodic Chart of Elements and/or quaternary ammonium hydroxides in the presence of water,
   (b) directly converting said carbamate into the corresponding free amine by hydrolyzing said carbamate with a strong acid selected from the group consisting of aqueous mineral acids, oxalic acid, formic acid and acetic acid, in a quantity equivalent to the quantity of said base and simultaneously converting any excess base into the corresponding acid salt and
   (c) isolating the free amine.

2. The process according to claim 1, characterized in that said aromatic and/or aliphatic primary amine also contains a member selected from the group consisting of alkylene ether, carbonate and acetal groups.

3. The process according to claim 1, characterized in that said base is selected from the group consisting of alkali metal and alkaline earth metal hydroxides.

4. The process according to claim 1 which comprises conducting step (b) by adding the reaction product of step (a) to said strong acid.

5. The process according to claim 1 which comprises mixing the reaction product of step (a) with said strong acid in such a way that equivalent quantities of acid and base react per unit of time.

6. The process according to claim 1 wherein step (a) is conducted using an equivalent ratio of $OH^\ominus$ to NCO-groups of between about 0.3:1 to 2:1.

7. The process according to claim 1 wherein said base is used in the form of a 5 to 50% by weight solution in water.

8. The process according to claim 1 which comprises adding from about 0.05 to 1 part by weight, based on 100 parts by weight of reaction mixture, of at least one emulsifying compound during step (a).

9. The process according to claim 1 which comprises isolating said free amine by distillation, filtration, recrystallization or dissolution and reprecipitation.

10. The process according to claim 1 wherein said compound containing aromatic and/or aliphatic NCO-groups is an NCO-preadduct of a polyisocyanate and a polyol component comprising a polyether containing 2 or 3 hydroxyl groups and having an average molecular weight from about 400 to 6000 in an NCO:OH ratio of from about 1.5:1 to 2.8:1.

11. The process according to claim 10 wherein said polyol component additionally comprises a polyol having a molecular weight of from about 62 to 399.

12. The process according to claim 10 wherein said polyisocyanate is a tolylene diisocyanate or a mixture of isomeric tolylene diisocyanates.

13. The process of claim 1 wherein said strong acid is an aqueous mineral acid.

14. The process of claim 1 wherein said strong acid is sulfuric acid.

* * * * *